United States Patent
Stumer et al.

(10) Patent No.: US 6,678,357 B2
(45) Date of Patent: Jan. 13, 2004

(54) INTERNET PROTOCOL (IP) EMERGENCY CONNECTIONS (ITEC) TELEPHONY

(75) Inventors: Peggy M. Stumer, Boca Raton, FL (US); Robert Stampfl, Hohenkammer (DE); Alfons Fartmann, Neufahrn (DE); Walter Hipfinger, Vienna (AT)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 214 days.

(21) Appl. No.: 09/963,242

(22) Filed: Sep. 26, 2001

(65) Prior Publication Data

US 2003/0063714 A1 Apr. 3, 2003

(51) Int. Cl.[7] .................. H04M 11/04
(52) U.S. Cl. .................. 379/45; 379/37
(58) Field of Search .......... 379/37–51, 90.01, 379/110.01, 93.01–93.08, 93.26–93.28, 93.37; 370/259, 351

(56) References Cited

U.S. PATENT DOCUMENTS

| | | | |
|---|---|---|---|
| 4,924,491 A | 5/1990 | Compton et al. | 379/37 |
| 5,161,180 A | 11/1992 | Chavous | 379/45 |
| 5,339,351 A | 8/1994 | Hoskinson et al. | 379/45 |
| 5,347,567 A | 9/1994 | Moody et al. | 379/45 |
| 5,347,568 A | 9/1994 | Moody et al. | 379/45 |
| 5,771,283 A | 6/1998 | Chang et al. | 379/142 |
| 5,864,755 A | 1/1999 | King et al. | 455/404 |
| 6,028,915 A | 2/2000 | McNevin | 379/49 |
| 6,243,442 B1 | 6/2001 | Tanaka et al. | 379/45 |
| 6,266,397 B1 | 7/2001 | Stoner | 379/45 |
| 6,289,083 B1 | 9/2001 | Ray | 379/49 |
| 6,301,483 B1 | 10/2001 | Israelsson | 455/462 |
| 6,370,232 B1 | 4/2002 | Yrjana | 379/37 |
| 2002/0101961 A1 * | 8/2002 | Karnik et al. | 379/45 |

FOREIGN PATENT DOCUMENTS

| | | |
|---|---|---|
| EP | 0 700 222 A2 | 3/1996 |
| EP | 1 009 177 A2 | 6/2000 |
| GB | 2 320 849 A | 7/1998 |
| GB | 2 349 774 A | 11/2000 |
| JP | 402216992 A | 8/1990 |
| JP | 407336433 A | 12/1995 |
| JP | 408307438 A | 11/1996 |
| JP | 410051553 A | 2/1998 |
| JP | 410210171 A | 8/1998 |
| JP | 411275263 A | 10/1999 |
| WO | WO 00/07393 | 2/2000 |

OTHER PUBLICATIONS

"NENA Technical Information Document on Model Legislation Enhanced 9–1–1 for Multi–Line Telephone Systems", Nov. 2000, pp. 1–15.

Cisco Systems Contribution to Assist Tr–41 Standards Committee entitled "Enterprise Network–Based Solution for Locating 911 Caller Using an IP Phone"; dated Feb. 2001, pp. 1–4; Document No. TR–41.4/01–02–069.

* cited by examiner

Primary Examiner—Wing Chan

(57) ABSTRACT

An IP Telephony Emergency Connections (ITEC) system and method that determines the precise origin of an emergency call and routes the call to the proper Public Service Answering Point (PSAP). A source-based routing mechanism is provided in an IP telephony type network, such as a VoIP or IP over LAN/ATM. Emergency calls are routed to the correct PSAP jurisdiction. Each server/switch may include the mechanism such that the IP Telephony network can identify an E911 connection and egress to a public network at a point closest to the emergency call point of origin. Whenever an emergency number call is made, the call's origin is determined during call setup establishment. Every port or end user jack in the network is assigned a Source Group Index (SGI), which is a number or index representing each PSAP jurisdiction in the network. All ports/jacks within the same PSAP jurisdiction are assigned the same SGI. Users may be in different areas of multiple PSAP jurisdictions.

21 Claims, 6 Drawing Sheets

INTERNET PROTOCOL (IP) EMERGENCY CONNECTIONS (ITEC) TELEPHONY

RELATED APPLICATION

This application is related to co-owned co-pending application Ser. No. 09/816,627 entitled "Priority Based Methods and Apparatus For Transmitting Accurate Emergency Location Identification Numbers (ELINs) From Behind A Multiline Telephone system (MLTS)"; co-owned, co-pending application Ser. No. 09/816,380 entitled "Methods And Apparatus For Transmitting Over A Private Network Accurate Emergency Location Identification Numbers (ELINs) From Behind a Multiline Telephone System (MLTS)"; co-owned co-pending application Ser. No. 09/816,823 entitled "Methods And Apparatus For Transmitting Accurate Emergency Location Identification Numbers (ELINs) From Behind A Multi-Line Telephone System (MLTS) After An Emergency Caller Disconnects"; co-owned co-pending application Ser. No. 09/816,838 entitled "Methods And Apparatus For Transmitting Accurate Emergency Location Identification Numbers (ELINs) After An Emergency Caller Disconnects"; co-owned co-pending application Ser. No. 09/815,685 entitled "Methods And Apparatus For Dialing An Emergency Telephone Number From A Teleworking Client Remotely Coupled To A PBX"; co-owned co-pending application Ser. No. 09/815,468 entitled "System For Dialing An Emergency Telephone Number From A Teleworking Client Remotely Coupled To A PBX"; and co-owned co-pending application Ser. No. 09/816,843 entitled "Methods And Apparatus For Transmitting Accurate Emergency Location Identification Numbers (ELINs) From Behind A Multi-Line Telephone System (MLTS) Utilizing Port Equipment Numbers", the complete disclosures of which are hereby incorporated by reference.

BACKGROUND OF THE INVENTION

1. Field of the Invention

This invention relates to telecommunications systems, especially telecommunication systems capable of computer telephony such as voice over internet protocol (VoIP). Specifically, the invention relates to completing an emergency, e.g. 911, call from a station/device over a data network, e.g., a private corporate local area network (LAN/IP) or the Internet, to a public network emergency facility and delivering precise location information of the caller and a call back number based on a port equipment number associated with the port from which the emergency call originated.

2. Brief Description of the Prior Art

When a caller calls an emergency number, e.g. 911 (E911), the call is routed to a Public Safety Answering Point (PSAP). In some jurisdictions, regulatory agencies require that the caller's telephone number/callback number and/or precise physical location referred to as an Emergency Location Identification Number (ELIN), be automatically provided to the PSAP. The information in the ELIN is used to locate the caller and to call back to the caller should there be a disconnect.

A caller identification (i.e., telephone number and ELIN) may be delivered to the PSAP either in-band (e.g., using DTMF signaling) or out-of-band (e.g., using ISDN signaling) depending on the type of trunk circuit employed. Normally, for residential callers Caller ID number is sufficient for the PSAP. In some cases, the ELIN is geodetic, i.e. includes earth coordinates or geo-positional synchronous (GPS) data.

Digitally encoded voice communications that are transmitted over a network, using what is typically referred to as Voice over Internet Protocol (VoIP) may originate anywhere and possibly, follow a circuitous convoluted route to a distant destination for far-end hop-off to a public service telephone network (PSTN). Thus, placing an E911 call over a VoIP enabled telephone network, may be a problem. Heretofore, there has not been a way in an IP network (e.g., voice over IP) to identify the source location of an originating device whose destination is 911 (or other emergency number) and to route the call to the proper PSAP jurisdiction (or other designated destination).

Thus, there is a need for a way to determine the proper destination PSAP of emergency calls in an IP network and further to correctly route an emergency call from the IP network to the public network of the appropriate PSAP.

SUMMARY OF THE INVENTION

It is therefore a purpose of the invention to accurately report the emergency location of an emergency caller calling on a VoIP network to public safety personnel.

It is another purpose of the invention to accurately report the callback number of an emergency caller using VoIP to public safety personnel.

It is yet another purpose of the invention to accurately report the ELIN and callback number of a caller making an emergency call using VoIP to call a PSAP over a private network in a manner that does not interfere with features of the PBX/MLTS.

It is yet another purpose of the invention to locate an E911 caller from the source of the call, regardless of the call origination location including calls originating in an IP private network, and route the call to the most appropriate PSAP, closest to the caller.

The present invention is an IP Telephony Emergency Connections (ITEC) system and method that determines the precise origin of an emergency call and routes the call to the proper Public Service Answering Point (PSAP). A source-based routing mechanism is provided in an IP telephony type network, such as a Voice over IP (VoIP) or IP over Local Area Network/Asynchronous Transfer Mode (LAN/ATM). Emergency calls are routed to the correct PSAP jurisdiction. Emergency calls may include, but are not limited to voice calls. The routing mechanism may be deployed in any intelligent distributed or centralized network. For example, a server/switch at a gateway may include the mechanism such that the IP Telephony network can identify an E911 connection and egress to a public network at a point closest to the emergency call point of origin. Whenever a call is recognized as being an emergency number call, the call's origin is determined during call setup establishment. Every port or end user jack in the network is assigned a Source Group Index (SGI), regardless of whether a port is physical or logical, e.g., for multi-drop. An SGI is a number or index representing each PSAP jurisdiction in the network. Port/jack level management granularity allows any server/switch to serve users that may be in different areas of multiple PSAP jurisdictions. So, all ports/jacks within the same PSAP jurisdiction are assigned the same SGI.

Advantageously, an emergency call made using VoIP is routed to the proper authorities. The routing can be provided at any network entity that is equipped with appropriate trunks, including the network entity where the call originated or, at a gateway located near the source of the call. This call handling circumvents normal call routing and may fulfill expected governmental requirements for emergency calls. Accordingly, emergency request information is sent to the correct PSAP regardless of where the user resides in an IP network.

Thus, the apparatus of the invention includes database management, emergency number detection, call routing and both ISDN and non-ISDN signaling. The present invention may be configured so that either the callback number, the ELIN, or both are transmitted to the PSAP. Further, the invention may be configured to recognize multiple emergency numbers and to give emergency calls priority over non-emergency calls.

Additional benefits and features of the invention will be apparent from the following detailed description taken together with the attached drawings.

DETAILED DESCRIPTION

Figure 1:
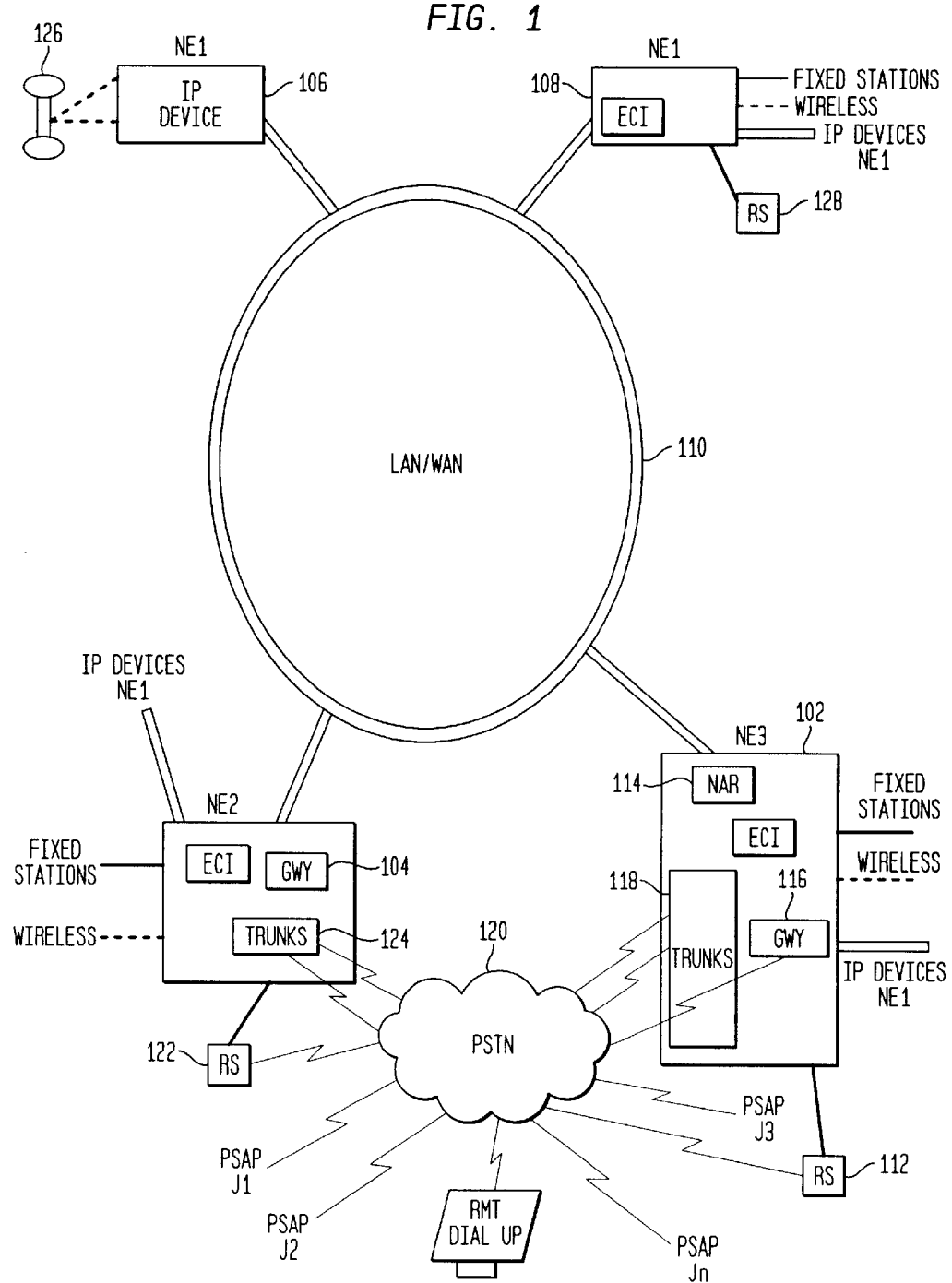
FIG. 1 shows an example of an overview of a preferred embodiment network with Voice over IP (VoIP) emergency call capability (IP Telephony Emergency Connections (ITEC)) according to the present invention.

Turning now to the drawings and more particularly FIG. 1 shows an example of an overview of a preferred embodiment network 100 with Voice over IP (VoIP) emergency call capability (IP Telephony Emergency Connections (ITEC)) according to the present invention. Essentially, ITEC is a source-based routing mechanism in an IP Telephony type network (e.g., voice over IP or IP over Local Area Network/ Asynchronous Transfer Mode (LAN/ATM)) that determines the precise emergency call origin in a Public Service Answering Point (PSAP)) jurisdiction of an emergency call (including, but not limited to voice calls) and routes the call to the appropriate public safety personnel in that jurisdiction. This routing mechanism may be developed in an intelligent network routing entity 102, 104 with other network entities 106, 108 that are in communication with each other over Local Area Network (LAN) or Wide Area Network (WAN) 110. The intelligent network routing entity maybe distributed or centralized, for example, a server/ switch, gateway 102, 104, where the IP Telephony network can convert the emergency call connection (if required) and egress to a public network at a point closest to the point of origin of the call. Whenever a call is recognized as an emergency number, the preferred routing mechanism makes a call origin determination during call setup establishment. Each server/switch 102 may serve users that span multiple PSAP jurisdictions, so every port or end user jack in the network 100, whether physical and/or logical e.g., for multidrop, is assigned a Source Group Index (SGI). Each PSAP jurisdiction in the network is represented by one SGI and so, all ports/jacks within the same PSAP jurisdiction are assigned the same SGI.

All network entities, such as ethernet switches and servers, where users are attached to ports/jacks or where end user devices are attached to the IP network include a unique Emergency Connection Identifier (ECI) module. At least one Network Area Router (NAR) module (in server 102 in this example) provides database maintenance, administration and special messaging, i.e., packets and internal messages. The ECI modules and data may reside in one or more network entities.

For purposes of the description of the present invention, network entities may be categorized as belonging to one of three categories, NE1, NE2 or NE3. NE1 type devices include only an ECI module and do not include a gateway (GWY) or a centralized manager (MGR). NE2 type devices include both an ECI module and a gateway, but do not include a centralized manager. NE3 devices are Network Area Routers (NAR) that each include an ECI module, a gateway and a centralized manager. Thus, server 102 is an NE3 type network entity. Remote switch 104 is an NE2 type network entity. Devices 106, 108 are each NE1 type network entities.

Server 102 is shown with ports for fixed stations, wireless phones, IP devices and one or more remote stations 112 attached and in communication with the LAN/WAN 110 through network area router 114. Both gateway 116 and trunks 118 are connected to a public service (or switched) telephone network (PSTN) 120. Each remote station 112 is directly connected to PSTN 120. Remote switch 104 is shown with ports for IP devices, fixed stations, wireless phones and one or more remote stations 122. As an NE2 device, remote switch 104 includes the LAN/WAN 110 through a trunk 124 with the PSTN 120. So, in this example, network entity 106 is an internet protocol (IP) device, e.g., a communication device with an attached handset 126. Device 108, which is an NE1 type network entity, includes ports for various communication type devices such as remote station 128, fixed stations, wireless devices and IP devices. The PSTN 120 is in telephonic communication with Public Safety Answering Point (PSAP) jurisdictions (Jl–Jn) that are located in each corresponding port location for each of the network entities 102, 104, 106, 108.

Further, the PSTN 120 may be in communication with a remote dial-up Emergency Location identification Number Apparatus as described in co-owned co-pending application Ser. No. 09/816,627 entitled "Priority Based Methods and Apparatus For Transmitting Accurate Emergency Location Identification Numbers (ELINs) From Behind A Multiline Telephone system (MLTS)"; co-owned, co-pending application Ser. No. 09/816,380 entitled "Methods And Apparatus For Transmitting Over A Private Network Accurate Emergency Location Identification Numbers (ELINs) From Behind a Multiline Telephone System (MLTS)"; co-owned co-pending application Ser. No. 09/816,823 entitled "Methods And Apparatus For Transmitting Accurate Emergency Location Identification Numbers (ELINs) From Behind A Multi-Line Telephone System (MLTS) After An Emergency Caller Disconnects"; co-owned co-pending application Ser. No. 09/816,838 entitled "Methods And Apparatus For Transmitting Accurate Emergency Location Identification Numbers (ELINs) After An Emergency Caller Disconnects"; co-owned co-pending application Ser. No. 09/815,685 entitled "Methods And Apparatus For Dialing An Emergency Telephone Number From A Teleworking Client Remotely Coupled To A PBX"; co-owned co-pending application Ser. No. 09/815,468 entitled "System For Dialing An Emergency Telephone Number From A Teleworking Client Remotely Coupled To A PBX"; and co-owned co-pending application Ser. No. 09/816,843 entitled "Methods And Apparatus For Transmitting Accurate Emergency Location Identification Numbers (ELINs) From Behind A Multi-Line Telephone System (MLTS) Utilizing Port Equipment Numbers", the complete disclosures of which are hereby incorporated by reference, and referred to generically hereinafter as ELIN references or an ELIN apparatus.

It is understood that the number of PSAPs involved depends on the location of ports connecting each individual fixed station, wireless device, IP device and remote station for each of the individual network entities 102, 104, 106, 108. Each PSAP jurisdiction is a geographically distinct location, e.g., a county, a town, a city, a precinct, etc.) All ports/jacks, physically located within each jurisdiction must have the same SGI assigned for that particular region. Therefore, users may be attached to/move between the different network entities and the assigned SGI is based on the port to which they are physically connected. Emergency calls placed from each user are routed according to the SGI to the correct PSAP jurisdiction. Users connected to NE1 network entities 106, 108 are routed through server 102 or remote switch 104 to the PSTN 120 (i.e., whichever entity has access to the PSAP correct jurisdiction) and, thereafter, the call is directed to public safety personnel in jurisdiction, J1 . . . , Jn.

When a number is dialed, the ECI module checks an ECI emergency number table to determine if the number is an emergency call number as indicated by whether the dialed number is listed as such. If the dialed number is not found in the ECI table, the call is not processed by ITEC. However, if the number matches an emergency number in the ECI table, then, the ITEC processes the call and it is routed to a PSAP jurisdiction based on the originating port SGI. The NAR determines the route based on the port's SGI which is included in routing tables and routes emergency calls to egress to the proper PSAP jurisdiction. Preferably, the ECI modules are located in each individual network entity 102, 104, 106, 108. However, all ECI modules may be located at a central processing entity, provided the PENs are unique network wide (e.g., prefixed with a network entity unique identifier).

Figure 2:
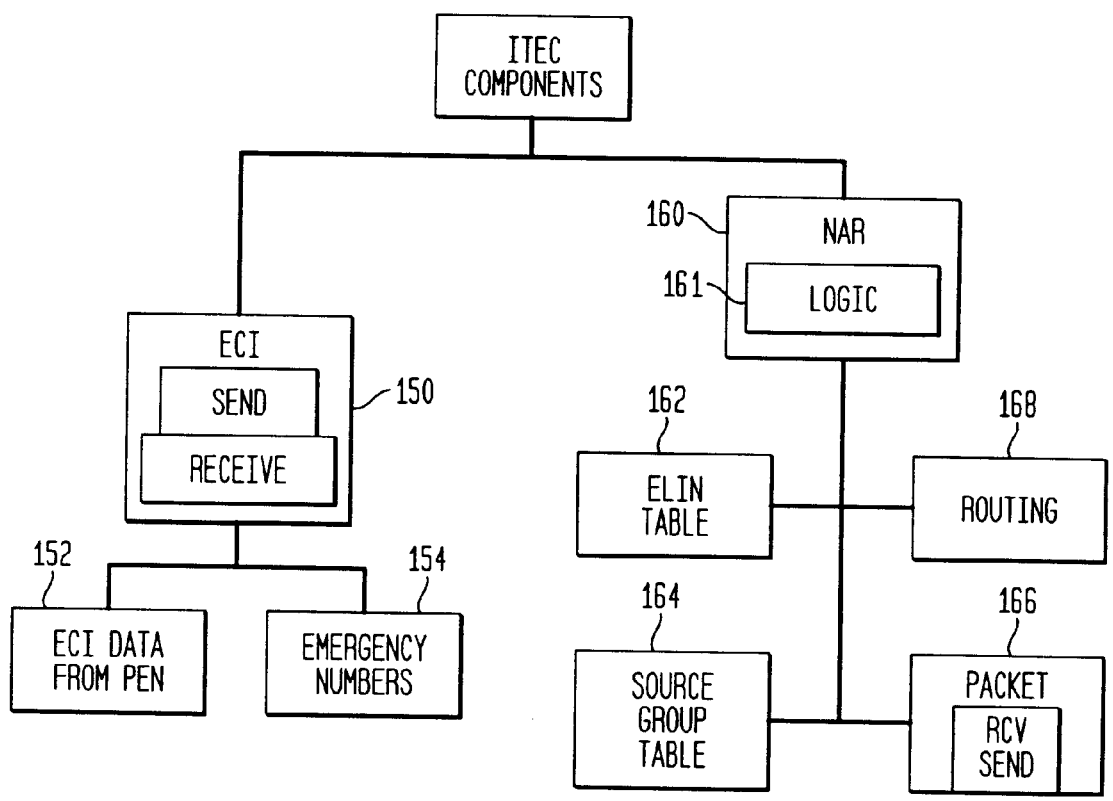
FIG. 2 shows an example of ITEC components of network elements of a preferred embodiment system according to the present invention.

FIG. 2 shows an example of ITEC components of network elements of a preferred embodiment system according to the present invention. As noted above, each network element includes an emergency connection identifier (ECI) module 150 regardless of network element type. Further, at least one network element includes a network area router NAR 160, i.e., NE3 type network element. The ECI module 150 both sends and receives messages and handles all communications between the NAR 160 and users at connected ports, regardless of whether the ECI module 150 and NAR 160 are in the same or separate network elements. Accordingly, the ECI module 150 also includes ECI data in an ECI data table 152 for each port in the network entity. An ECI table 152 entry is attached to any emergency messages that are sent from or received by the network entity. ECI data table 152 includes a port equipment number (PEN) field, a port source group number (SGI) field and a local PSAP emergency location identifier number (ELINx) field. Also, the ECI module 150 includes an emergency number table 154 with a list of emergency numbers and associated priorities.

If the network entity is NE3 type, it includes network area router 160 and logic 161. The NAR logic 161 routes messages to and from connected network entities as directed by each particular network entity's ECI module 150. Accordingly, the network area router maintains an ELIN table 162, a source group table 164, an IP packet receive/send table 166 and a routing table 168. The routing table 168 corresponds messages to a particular origination port as identified by the ECI data of the particular message.

Each ECI module 150 recognizes emergency calls that originate from the particular network entity in which the ECI module 150 resides. The ECI module 150 identifies each emergency call's SGI and other pertinent information (e.g., ELIN) and flags emergency calls for emergency priority. The ECI module 150 compares each call's destination digits to entries in an ECI emergency number table 154. The ECI module 150 transmits a small data packet (or internal message when the NAR 160 and ECI module 150 reside in the same network entity) that includes the port's SGI, destination digits and other connection information to the NAR 160. The NAR logic 160 processes each data packet (subject to normal retransmission handling) or internal message (if the ECI module 150 and NAR 160 are located together) in order to determine how the call should be switched. A call may be sent initially as data packets for partial packet switching and, then to a gateway for circuit-switching or, immediately to a local B-channel for circuit switching from the source entity. The routing instructions are returned to the sender ECI module 150 or an acknowledgment (ACK) may be sent when another gateway is to route the call. This message/packet exchange must be uniquely identified with each particular call.

Figure 3:
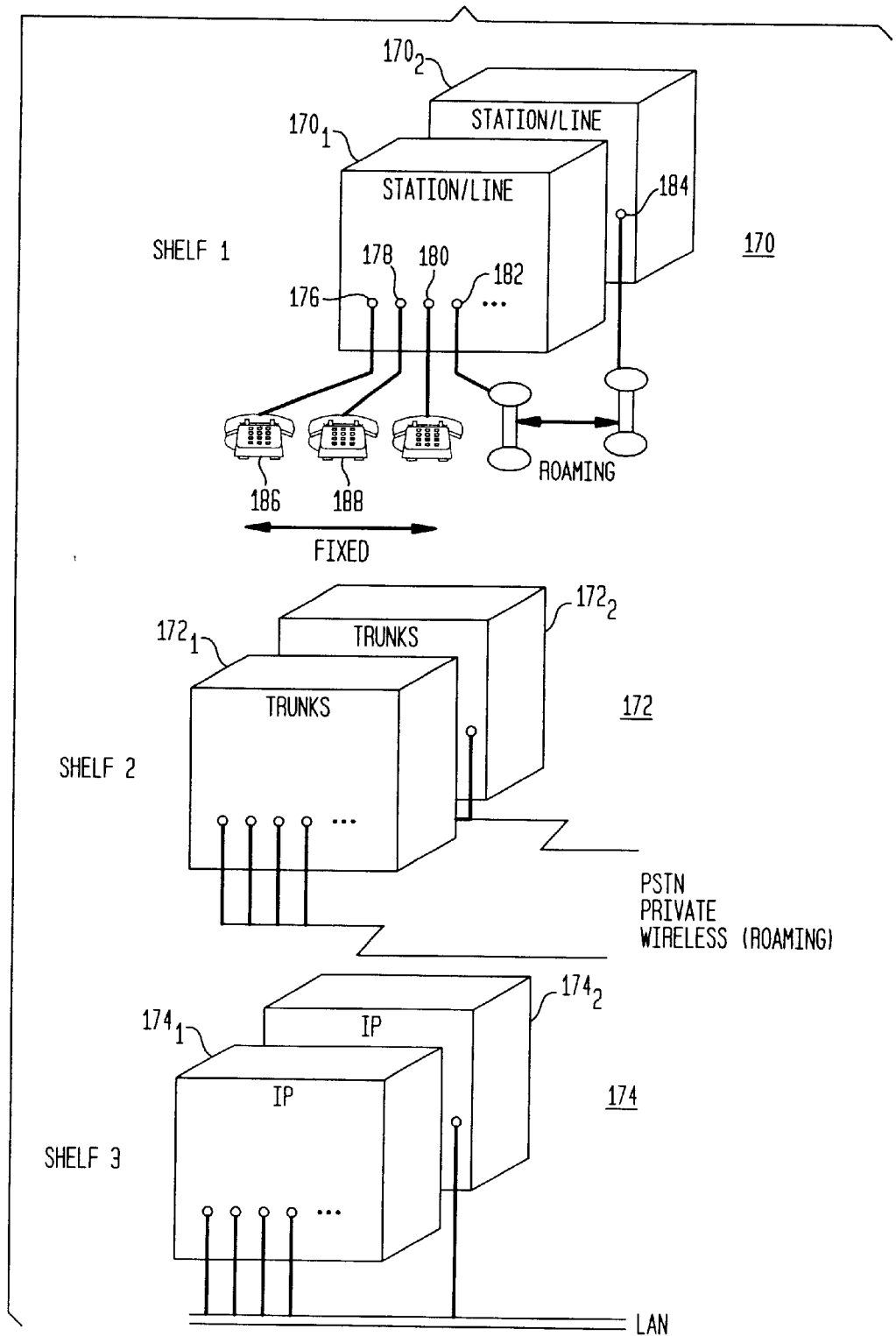
FIG. 3 shows an example of SGI and ELIN index port assignment for three shelves.

FIG. 3 shows an example of SGI and ELIN index port assignments for three shelves 170, 172, 174. Each shelf 170, 172, 174 includes two slots indicated by a corresponding 1 or 2 subscript, e.g., $170_1$, $170_2$. Boards in each slot may be stations/lines, trunks or IP interfaces, for example. Ports 176, 178, 180, 182, 184 are shown, typically in each slot, e.g., on station/lines $170_1$, $170_2$ and so on. It should be noted that this is for example only and the present invention may be applied to any combination of slots or shelves.

TABLE 1

| PEN | SGI | ELIN index | Comment |
| --- | --- | --- | --- |
| 1-1-001 | 2 | 101 | fixed station |
| 1-2-005 | 2 | 220 | IP device |
| 1-3-001 | 8 | 125 | RS |
| 1-4-002 | 2 | 23 | wireless phone |

Table 1 is an example of an ECI PEN table, e.g., table 152 of FIG. 2. Port Equipment Numbers (PEN) point to the assigned ELIN and SGI for the particular port, where the port is ambiguous network wide. Port equipment numbers are assigned to each port and have the format: shelf number-slot number-port number. Thus, the number 2-11-111 indicates shelf number 2, slot number 11, port number 111. Typically fixed stations are in the same PSAP jurisdiction as the particular network entity and so, have the same SGI. If a station/device or RS extends into another PSAP jurisdiction, a different SGI index (i.e., the SGI for devices in that jurisdiction) is assigned. The ELIN index is as described in the ELIN references.

TABLE 2

| Dialed # | Priority |
| --- | --- |
| 9 1 1 | 1 |
| 9 9 1 1 | 1 |
| 9 9 3 1 1 1 1 | 3 e.g., local police station |

Table 2 is an example of an ECI Emergency Number Table. Calls are assigned priority relative to normal everyday calls which may be given a lowest priority, e.g., priority 9. Emergency calls are typically given highest priority, priority one. So, for purposes of this example, one is the highest priority and nine is the lowest. Each call is assigned a unique call ID, e.g. a number generated from a random number generator. Any emergency number is flagged by the ECI data and does not include a routing number. When a call is made from a device at a network entity, the ECI module checks against an emergency number in the routing table. If the dialed number is an emergency number, then the ECI module processes the number. Otherwise the ECI module ignores the number and it is treated as a normal call.

In this example, shelf 170 has three ports assigned for fixed telephone, and additional ports are assigned for roaming connection, e.g., cellular phones. A remote station may also be connected to station/line boards $170_1$, $170_2$. Fixed telephone 186 is assigned to SG1 and is located in a different PSAP jurisdiction than fixed telephone 188, which is assigned to SG4. Trunks in shelf 172 connect to a PSTN and also provide private and wireless connections to the PSTN. The first port of shelf 172 is also shown in the same jurisdiction as fixed telephone 186 and so, is also assigned SG1. Shelf 174 is shown with port connections to a LAN. Each of the LAN port connections may be distributed in different jurisdictions and assigned, SG1, SG2, SG3 . . . , for example. An ECI message may be internal (when the ECI module is located on an NE3 type network entity) or over a signaling channel to an NE3 type network entity. Generally, an ECI packet includes an ECI packet type, a calling number (i.e., the user not the port number) a called number (the PSAP telephone number) a network-wide unique call ID and ECI data. As noted above ECI data may include the SGI and ELIN index. Optionally, a priority may also be included.

Figure 4:
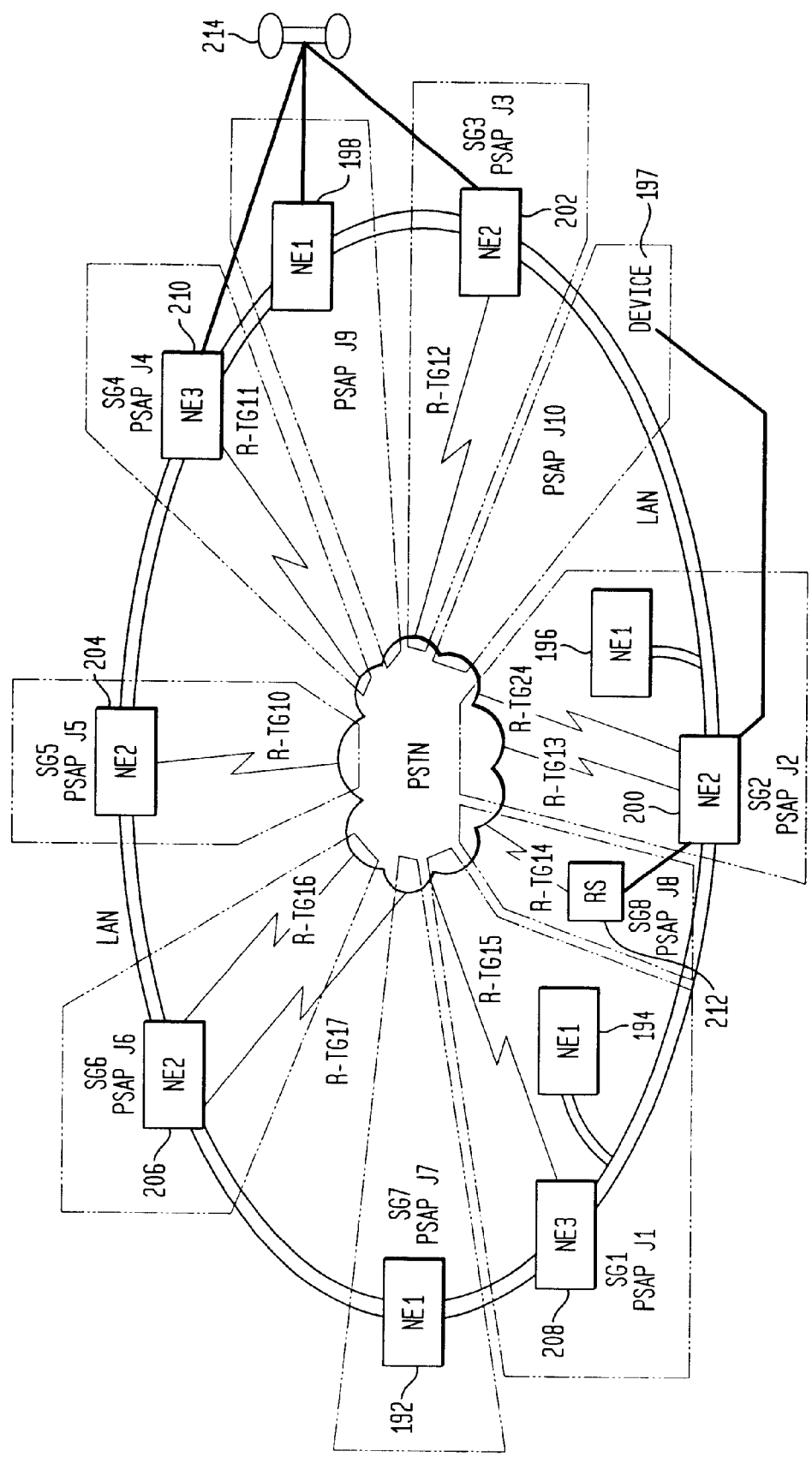
FIG. 4 shows an example of various network entities distributed throughout different geographically distinct PSAP jurisdictions with corresponding routes and trunk group assignments.

FIG. 4 shows an example of various network entities distributed throughout different geographically distinct PSAP jurisdictions with corresponding routes and trunk group assignments. This example includes ten individual network entities 192–210. Network entities 192, 194, 196 and 198 are NE1 type Network entities. Network entities 200, 202, 204, and 206 are NE2 type network entities. Network entities 208 and 210 are NE3 type network entities. For redundancy, multiple NE3 type network entities (2 in this example) may serve NE1 and NE2 type network entities. A remote station 212 and a mobile/wireless phone 214 are shown. These ten network entities 192–210 include ports that are distributed in ten individual PSAP jurisdictions designated J1–J10. Typically, network entities have ports in the PSAP jurisdiction in which they are located. However, network entity 200 also includes ports in two other jurisdictions, including jurisdiction J2, J8 and J10. Network entity 206 includes ports in jurisdictions J6 and J7. Mobile phone 214 is potentially in connection with each of network entities 198 and 202 and 210 because of its roaming capability, e.g., handoff from one network entity 198, 202, 210 to another. Therefore, mobile phone 214 may be in each of jurisdictions J3, J9 and J4, respectively.

Accordingly, an emergency call may be made from a network port on network entity 200 where the port resides in jurisdiction J10. Relevant call information is passed over the IP network to one of NE3 208 or 210, depending upon which is controlling NE2 200 at the time of the call. An emergency call from device 197 is signaled through NE2 200 which has access to PSAP J10. The emergency call is relayed to the PSAP jurisdiction in J10. Likewise an emergency call made from network entity 194 in jurisdiction J1 is passed to network entity 208 which is a network area router. Network area router 208 passes the call to the PSTN to make the connection to the PSAP in J1. Also, an emergency call made from network entity 192 in jurisdiction J7 is signaled through network area router 208 to take route 17 from network entity 206 where the call is made, i.e., to the PSAP jurisdiction in J7.

So, for every PSAP jurisdiction where users reside in the IP network, at least one gateway (capable of switching a connection between IP network and PSTN technology, CAMA or ISDN) also must exist within that area. This gateway serves calls originating in that PSAP by either routing local calls to the PSTN or converting arriving emergency calls from IP packets to circuit-switched technology for egress to the public network.

TABLE 4

| Dial Pattern | Rt # | Priority | Comments |
| --- | --- | --- | --- |
| 1 2 3 4 | Rt 55 | 9 | normal call |
| 9 1 1 | Go to SG Table | ECI data | ITEC call |
| 9 9 1 1 | Go to SG Table | ECI data | ITEC call |
| 9 9 3 1 1 1 1 | Go to SG Table | ECI data | ITEC call |

Table 4 is an example of a NAR routing table with emergency call number entry examples. Each call number entry in this example includes a dial pattern, ECI data (SGI priority), a route number and a priority number. In this example a first dial pattern 1234 represents any DID number, for example, and the ECI data field indicates that the number is not an emergency number. This first dial pattern is associated with a route number 55 and given a low priority, 9, in this example. The following three entries are examples of emergency numbers. If an emergency number is dialed and matches one of these three the dial patterns, then, the corresponding ECI data indicates that the entry is an emergency number and must be handled by the ECI module. A typical United States emergency number, 911, is the second entry in the routing table. It is understood that any number may be selected as an emergency dial number. A corresponding ECI data entry for this second dial pattern may be a Y, indicating yes. The following dial pattern entry is 9911 corresponding to dialing 911 externally to a PBX, e.g., dialing 9 for an external line followed by 911. The final dial pattern entry is 999, which is also shown as in this example as corresponding to an emergency number and may include a Y in the corresponding ECI data field.

TABLE 5

| Index | Rt # | Comment |
| --- | --- | --- |
| 0 | . | Reserved |
| . | . | |
| 1 | 15 | |
| 2 | 13 | Mobile, Station, IP call 911 from NE 2, PSAP J2 |
| . | . | |
| . | . | |
| 8 | 14 | RS called 993111 (local police), PSAP J8 |
| . | | |
| . | | |

Table 5 shows an example of a Source Group Table with reference to the configuration and topology of the example of FIG. 4 that corresponds each source group index with a route number. In this example, source group index 0 is reserved for IP devices that are not directly connected to a network entity of the private IP network. These indirectly connected IP devices cannot ordinarily be located by a PEN-SGI-ELINx and so, in this example, they signal location information to a NE3 type network entity as SG0. This signaling may be by using a pre-programmed speed dial key or by providing GPS information, for example. Either type of signaling requires that the received information be processed to extract the correct call routing to the appropriate PSAP. Typically, can ELIN is not available from indirectly connected IP devices and so, inclusion of a callback number in the signaling is essential. Source group index 2 indicates that a emergency call has been placed from a geographical location served by route number 13 and, as indicated by the corresponding comments, that the call is an emergency call from a station in PSAP jurisdiction J2, e.g., a mobile phone, a local phone or a local IP phone.

TABLE 6

| Index | ELIN | TYPE | Callback # | Other table elements |
|---|---|---|---|---|
| 0 | 1002001000 | 1 | 5619235000 | N/A |
| 1 | 1002001001 | 9 | 9547301000 | N/A |
| 2 | 1002001002 | 9 | calling party # | N/A |
| . | | | | |
| . | | | | |
| . | | | | |

Table 6 is an example of an ELIN index table as described in the ELIN references and is shown for example only.

Figure 5A:
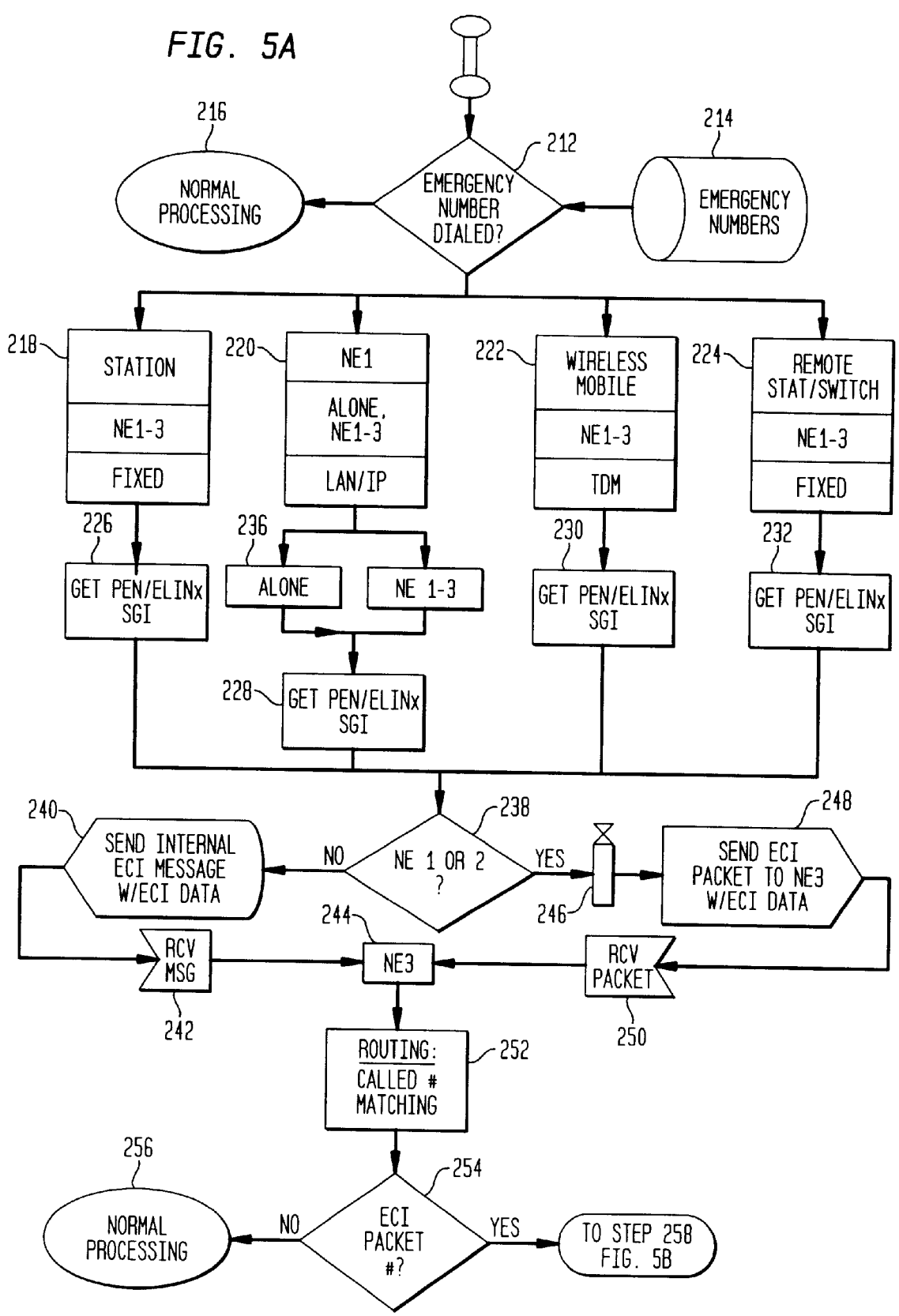
FIGS. 5A–B are a flow diagram showing how emergency numbers are processed according to a preferred embodiment of the present invention.
Figure 5B:
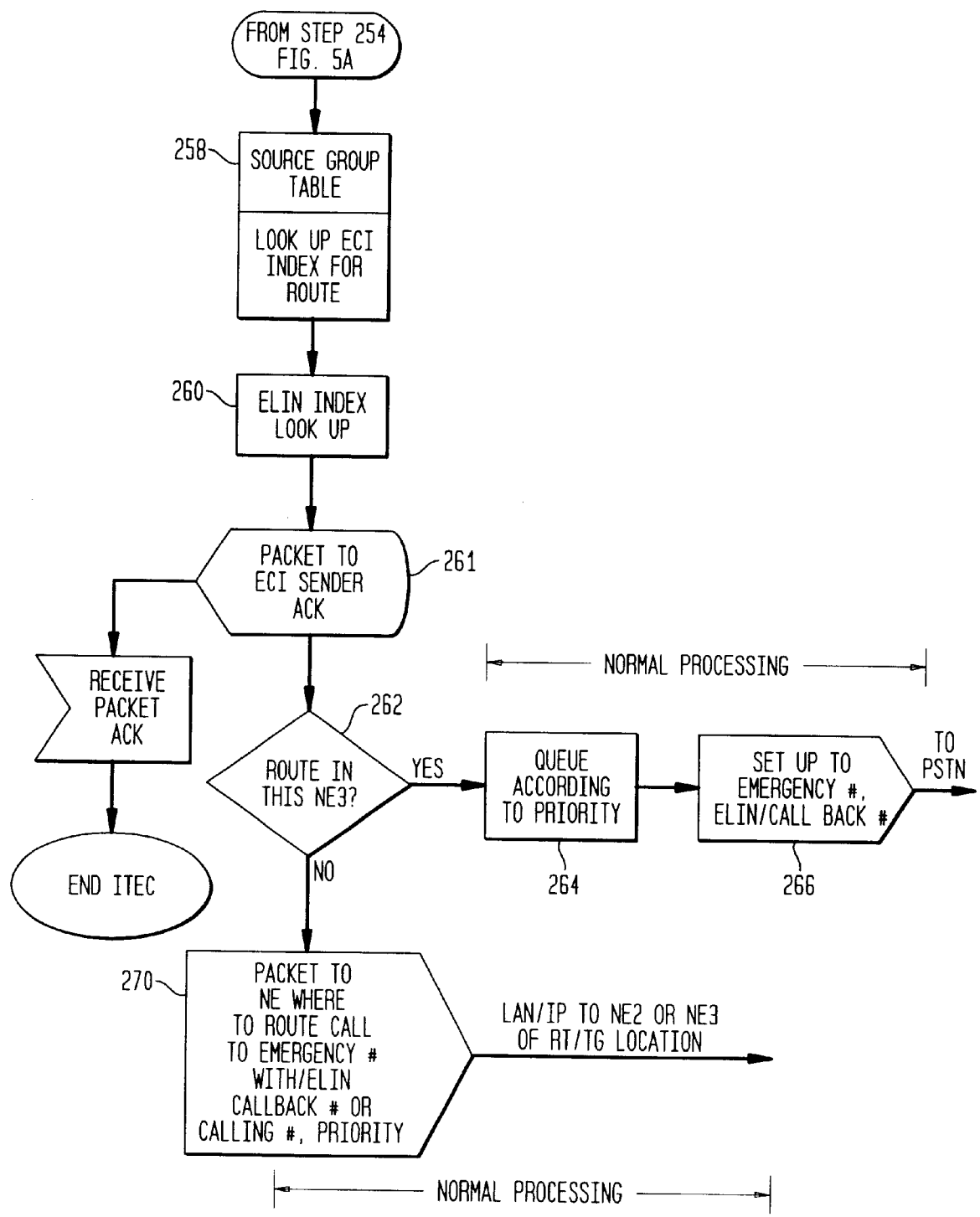

FIGS. 5A–B show a flow diagram of how emergency numbers are processed according to the preferred embodiment of the present invention. In step 212, a user dials a number that is checked against listed emergency numbers 214 to determine if it is an emergency number. If not, processing continues as normal in 216. Otherwise, the number is: an emergency number at one of a fixed station connected to a network entity 218; at a network entity dialed directly connected to the network 220; at a wireless or mobile phone in communication with a network entity 222 using for example time division multiplex (TDM); or, at a remote station or switch 224 in communication with a network entity. Upon receiving the number, the particular ECI module identifies the originating port in a respective one of step 226, 228, 230, or 232. So, for each connected port, the PEN, ELIN index, and the corresponding SGI number are identified. If the originating port is connected directly to the network and not to a network entity, then this is noted in step 236 and processing depends upon whether the device provides the selected indirect device SGI (e.g., SG0), appropriate callback number and available location data (e.g., GPS). Otherwise, however, at this point emergency calls that originate from a port connected to a network entity other than a network area router (i.e., an NE3 type network entity) are routed by a network area router according to source group number and ELINx, if available.

So, the call is checked in step 238 to determine whether it originates at a network area router or originates at an NE1 or NE2 type of network entity. If the call originates at a network area router port, then, in step 240 the call generates an internal message and is treated as such in step 242 and passed to the network area router in step 244. If, however, in step 238 it is determined that the call originates from an NE1 or NE2 type network entity, then, in step 246 the message is encoded as an IP packet with data link control, and transported via the IP physical layer. In step 248 a network wide unique call ID is assigned to the IP message, which includes the ECI data, and is sent as an emergency call request packet to the network address router. In step 250 the packet is received and passed to the network area router in step 244. In step 252 the called number is matched with a digit pattern in the routing table. In step 254 if the call is not associated with an ECI, it is treated as a normal call. Otherwise, it is treated as an emergency call.

Otherwise, in step 258 the ECI index is retrieved from the source group table. In step 260 the call back number and ELIN number are retrieved from the ELIN table. In step 261 an acknowledgment packet is sent to the ECI module in the originating network entity. Next, in step 262 a check determines if the source group number corresponds to a PSAP jurisdiction as a local to the network area router. If the PSAP jurisdiction is local to the network area router, then, in step 264 the call is queued according to priority number. In step 266, the queued call is placed to the local PSAP. So, a connection is made to the emergency number at the local PSAP jurisdiction and, the ELIN call back number is passed, for example over an ISDN network, to the local PSAP jurisdiction. If however, in step 262 it is determined that the PSAP jurisdiction is not local to the router, then in step 270, an NE2 or NE3 type network entity that is local to the emergency call source is identified and, the network area router sends the packet to the identified NE2 or NE3 type network entity.

According to the present invention in the context of the aforementioned examples, the call may be routed directly to the public network or, first transit over the private network (via one or more other MLTS) to a far end "hop off" to the public network. The private network route may include ISDN (e.g., QSIG/PSS1) or analog tie trunks.

Furthermore, according to the invention, the ELIN/callback number is sent with each emergency call over the private network, and then, to a public gateway multi line telephone system (MLTS). Dual Tone Multi-Frequency (DTMF) signals are encoded and passed over analog tie and facility IE Application Data Protocol Units (APDU) and are implementation dependent private extensions on a private network. The MLTS may send the emergency call and ELIN/callback number via an ISDN PRI or an analog Centralized Automatic Message Accounting (CAMA) trunk to the public network. In either case, the Central Office receives the necessary information and routes each emergency call to the proper 911 Tandem Office which routes the call to the appropriate PSAP.

While the invention has been described in terms of preferred embodiments, those skilled in the art will recognize that the invention can be practiced with modification within the spirit and scope of the appended claims.

What is claimed is:

1. A method for processing an emergency call made from a device connected to a network entity on a private network, said private network including one or more network entities, said method comprising the steps of:
   a) assigning a source group index (SGI) to each network entity port;
   b) identifying emergency calls;
   c) determining an origination port for each identified port emergency call;
   d) identifying a public safety answering point (PSAP) jurisdiction corresponding to the SGI assigned to each determined origination port; and
   e) connecting each identified emergency call with a corresponding identified PSAP.

2. A method as in claim 1 wherein said emergency call is a Voice over Internet Protocol (VoIP) call and the step (b) of identifying emergency calls comprises the steps of:

i) comparing a dialed number for each call with known emergency numbers; and ii) sending an emergency connection identifier (ECI) packet to a network area router (NAR) for a dialed number matching a known emergency number.

3. A method as in claim 2 wherein the ECI message includes an ECI packet type, a calling number, a called number, a call ID number and ECI data.

4. A method according to claim 3 wherein the ECI data includes the SGI assigned to said origination port of said identified emergency call and an emergency location identification number (ELIN) index number.

5. A method as in claim 4 wherein the ECI packet further includes call priority.

6. A method as in claim 5 wherein call priority is determined in the step (i) of comparing the dialed number with known emergency numbers.

7. A method as in claim 6 wherein identified emergency calls are queued according to said call priority.

8. A method as in claim 4 wherein the PSAP jurisdiction is identified by a route number retrieved from a source group table and corresponding to said SGI assigned to said identified emergency call.

9. A method as in claim 8 wherein the route number corresponds to the identified emergency call to said PSAP jurisdiction.

10. A method as in claim 9 further comprising the step of:

(f) sending an acknowledgment from said NAR to an ECI module located at said origination port.

11. A network including an apparatus for processing emergency calls made from connected devices, said network comprising:

a plurality of network entities communicating with each other;

a plurality of devices connected to said network entities, at least one network entity having two or more connected said devices;

a network area router (NAR) in at least one network entity; and an emergency connection identifier (ECI) module in at least one network entity with one or more ports, said ECI module in communication with said NAR, said ECI module identifying emergency calls made from devices connected to said one or more ports and forwarding identified emergency calls to said NAR, said NAR identifying a public safety access point (PSAP) corresponding to a point of origin of each identified emergency call and forwarding said each identified emergency call to said PSAP.

12. A network as in claim 11 wherein said ECI module comprises:

an emergency number table including one or more series of dialed numbers corresponding to emergency telephone numbers; and an ECI port equipment number (PEN) table including port equipment numbers for ports located in said network entity in which said ECI module is located and corresponding each said PEN with a source group index (SGI) number, said SGI number corresponding to a PSAP jurisdiction.

13. A network as in claim 12 wherein the ECI emergency number table further includes priority numbers corresponding to said emergency numbers.

14. A network as in claim 13 wherein said ECI PEN table further includes an ELIN index corresponding to each PEN entry.

15. A network as in claim 12 wherein the NAR includes a routing table, a source group table and an ELIN table.

16. A network as in claim 15 wherein said routing table provides a routing for identified dialed emergency numbers.

17. A network as in claim 16 wherein the source group table indicates a route number for each SGI number.

18. A network as in claim 12 wherein said at least one ECI module is two or more ECI modules, at least one of said two or more ECI modules is located on a common network entity with said NAR.

19. A network as in claim 18 wherein at least one network entity includes ports located in two or more PSAP jurisdictions.

20. A network as in claim 18 wherein said common network entity includes a gateway in communication with a public service telephone network (PSTN).

21. A network as in claim 20 wherein at least one other of said plurality of network entities includes an ECI module and a gateway in communication with said PSTN.

* * * * *